(12) United States Patent
Engelgau (10) Patent No.: US 6,860,549 B2
(45) Date of Patent: Mar. 1, 2005

(54) RETRACTABLE ROOF PANEL

(75) Inventor: Steven J. Engelgau, Royal Oak, MI (US)

(73) Assignee: Arvin Meritor Technology, LLC., Troy, MI (US)

( * ) Notice: Subject to any disclaimer, the term of this patent is extended or adjusted under 35 U.S.C. 154(b) by 0 days.

(21) Appl. No.: 10/316,527

(22) Filed: Dec. 11, 2002

(65) Prior Publication Data

US 2003/0085594 A1 May 8, 2003

Related U.S. Application Data

(63) Continuation-in-part of application No. 09/989,361, filed on Nov. 20, 2001, now Pat. No. 6,494,528, and a continuation-in-part of application No. 09/876,519, filed on Jun. 7, 2001.
(60) Provisional application No. 60/252,238, filed on Nov. 20, 2000.

(51) Int. Cl.[7] .................................................. B60J 7/053
(52) U.S. Cl. ............................ 296/216.04; 296/216.05; 296/216.08; 296/223
(58) Field of Search ...................... 296/216.04, 215.05, 296/216.07, 216.08, 220.01, 223

(56) References Cited

U.S. PATENT DOCUMENTS

| 2,203,931 A |   | 6/1940  | Solomon        |
|-------------|---|---------|----------------|
| 3,657,992 A |   | 4/1972  | Minnick, Jr.   |
| 4,043,590 A |   | 8/1977  | Pizzuti        |
| 4,063,774 A |   | 12/1977 | Hanks          |
| 4,272,121 A |   | 6/1981  | Kim            |
| 4,275,920 A |   | 6/1981  | Pohl           |
| 4,312,533 A |   | 1/1982  | Jardin et al.  |
| 4,376,543 A | * | 3/1983  | Sakagami       |
| 4,647,106 A |   | 3/1987  | Furst          |
| 4,659,140 A |   | 4/1987  | Fuerst         |
| 4,718,714 A |   | 1/1988  | Tanino et al.  |
| 4,787,665 A |   | 11/1988 | Rich           |
| 4,802,707 A |   | 2/1989  | Schlapp        |
| 4,826,387 A |   | 5/1989  | Audet          |
| 4,923,245 A |   | 5/1990  | Kuwabara       |
| 5,046,779 A |   | 9/1991  | Ichinose et al.|
| 5,069,501 A |   | 12/1991 | Baldwin et al. |
| 5,090,767 A |   | 2/1992  | Schreiter et al.|
| 5,114,208 A |   | 5/1992  | Ikeda et al.   |
| 5,197,779 A |   | 3/1993  | Mizuno et al.  |
| 5,362,122 A |   | 11/1994 | Reihl et al.   |

(List continued on next page.)

FOREIGN PATENT DOCUMENTS

| WO | WO/92/04199 | 3/1992 |
|----|-------------|--------|
| WO | WO 00/06404 | 2/2000 |

OTHER PUBLICATIONS

European Search Report EP02253964 Mar. 11, 2003.
European Search Report EP01309757 Mar. 11, 2003.

*Primary Examiner*—Dennis H. Pedder
(74) *Attorney, Agent, or Firm*—Carlson, Gaskey & Olds, P.C.

(57) ABSTRACT

A vehicle is provided that includes a roof with a roof opening and a rear body portion with a rear opening. Spaced apart guide rails are supported on an exterior surface of the roof. A retractable roof panel is supported on the guide rails by guide members that move along the guide rails along a path. The roof opening and the roof panel extend to the rearward end where the roof panel defines a rear header. The retractable roof panel may be driven from a closed positioned forward to an open position where the roof panel is adjacent to the exterior surface of the roof. The rear gate assembly, which is arranged in the rear opening, may be opened to provide access to the rear cargo area of the vehicle. With the rear gate assembly and retractable roof panel open, large items may be slid into the cargo area and may extend above the plane of the roof.

19 Claims, 10 Drawing Sheets

U.S. PATENT DOCUMENTS

| | | |
|---|---|---|
| 5,375,904 A | 12/1994 | Huyer |
| 5,405,185 A | 4/1995 | Cheron et al. |
| 5,417,358 A | 5/1995 | Haselgrove |
| 5,464,267 A | 11/1995 | Racine et al. |
| 5,558,388 A | 9/1996 | Furst et al. |
| 5,673,831 A | 10/1997 | Spratt |
| 5,746,475 A | 5/1998 | Caye et al. |
| 5,775,769 A | 7/1998 | Reihl et al. |
| 5,791,728 A | 8/1998 | Hausrath |
| 5,884,824 A | 3/1999 | Spring, Jr. |
| 5,951,100 A | 9/1999 | Ewing et al. |
| 5,988,839 A | 11/1999 | Pokorney et al. |
| 6,012,768 A | 1/2000 | Nabuurs et al. |
| 6,036,259 A | 3/2000 | Hertel et al. |
| 6,056,352 A | 5/2000 | Ewing et al. |
| 6,062,637 A | 5/2000 | Hoffmann |
| 6,065,793 A | 5/2000 | Koshida et al. |
| 6,068,168 A | 5/2000 | Kreisler |
| 6,073,994 A | 6/2000 | Jardin et al. |
| 6,305,740 B1 * | 10/2001 | Staser et al. ................ 296/222 |
| 6,454,346 B1 * | 9/2002 | Nabuurs ................ 296/216.06 |
| 6,485,091 B2 * | 11/2002 | Karami et al. ......... 296/216.02 |
| 6,533,349 B2 * | 3/2003 | Nabuurs ................ 296/216.08 |

\* cited by examiner

RETRACTABLE ROOF PANEL

RELATED APPLICATIONS

This application is a continuation-in-part of U.S. application Ser. No. 09/989,361 filed Nov. 20, 2001 now U.S. Pat. No. 6,494,528, which claims priority to Provisional Application No. 60/252,238, filed Nov. 20, 2000 and U.S. patent application Ser. No. 09/876,519, filed Jun. 7, 2001 as a continuation-in-part.

BACKGROUND OF THE INVENTION

This invention relates to a roof assembly for a vehicle, and more particularly, the invention relates to a retractable roof panel that includes the rear header of the vehicle for providing improved access to the rear cargo area of the vehicle when the roof panel is retracted.

Sunroofs are desireable features to many vehicle customers. Sunroofs are typically arranged in an area above the driver and front passenger seats. The sunroof maybe be retracted to expose the interior of the vehicle to the environment and permit air and light to enter the vehicle. Typically, the opening for the sunroof is relatively small, and sunroofs have not been used to provide increased access to the interior of the vehicle. They have simply been used to provide a more pleasant driving experience to the vehicle occupants.

Once sunroofs are moved from the closed position to an open position, the sunroof is typically stowed in a area between the interior of the roof structure and an interior trim headliner. That is, the sunroof is stowed using the interior space of the vehicle such that it impinges upon the passenger's headroom. The larger the vehicle sunroof, the more problematic it may become to stow the sunroof. Significant vehicle design changes may be required to maintain occupant headroom. As a result, it is desireable to stow a sunroof in the open position in such a manner that interior space is not reduced.

Prior art sunroof assemblies have utilized rails located on the exterior of the roof for storing the sunroof outside of the vehicle. These prior art assemblies have incorporated a roller assembly received in a guide track in the rails. However, the rails lack means to keep debris from entering the guide tracks and inhibiting the operation of the roller assemblies. Even without debris inhibiting the proper operation of the sunroof, the large size of the sunroof makes it difficult for the sunroof to move desirably within the rails without binding.

Therefore, what is needed is a sunroof that does not impinge upon passenger headroom or reduce the interior space in the vehicle. Furthermore, what is needed is a sunroof that provides increased access to the cargo area within the vehicle such that loading and unloading of the vehicle is simplified and larger cargo items may be placed inside the vehicle.

SUMMARY OF THE INVENTION AND ADVANTAGES

The present invention provides a vehicle having a roof with a roof opening and a rear body portion with a rear opening. Spaced apart guide rails are supported on an exterior surface of the roof. A retractable roof panel is supported on the guide rails by guide members that move along the guide rails along a path. The roof opening and the roof panel extend to the rearward end where the roof panel defines a rear header. The retractable roof panel may be driven from a closed position forward to an open position where the roof panel is adjacent to the exterior surface of the roof. The rear gate assembly, which is arranged in the rear opening, may be opened to provide access to the rear cargo area of the vehicle. With the rear gate assembly and retractable roof panel open, large items may be slid into the cargo area and may extend above the plane of the roof.

The guide members move along a path defined by the guide rails. The guide member includes a roller assembly received within a channel in each of the guide rails and a bracket connected to the roller assembly supporting a drive cable. A bracket as supported on the roller assembly and is rotatable relative thereto. The roller assembly includes a flange and the bracket includes a stop of the flange engaging the stop causing the roller assembly and brackets to rotate together. As the roller assembly and its two lower rollers travel along the longitudinal guide rail into the curved portion of the support members connecting the rails to the roof, the roller assembly forces the bracket to rotate with it, which bends the drive cable to prevent it from binding within the support member and rails. The roller assembly may also include a roller biased in an upper direction against a ceiling of the guide rail to vertically locate the sunroof as it moves along the rail and reduce noise and vibration. Seals may be used in the guide rail to seal the drive cable and any wires in a compartment away from debris.

Accordingly, the above invention provides a sunroof that does not impinge upon passenger headroom or reduce the interior space in the vehicle. Furthermore, a sunroof is provided that increases access to the cargo area within the vehicle such that loading and unloading of the vehicle is simplified and larger cargo items may be placed inside the vehicle.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
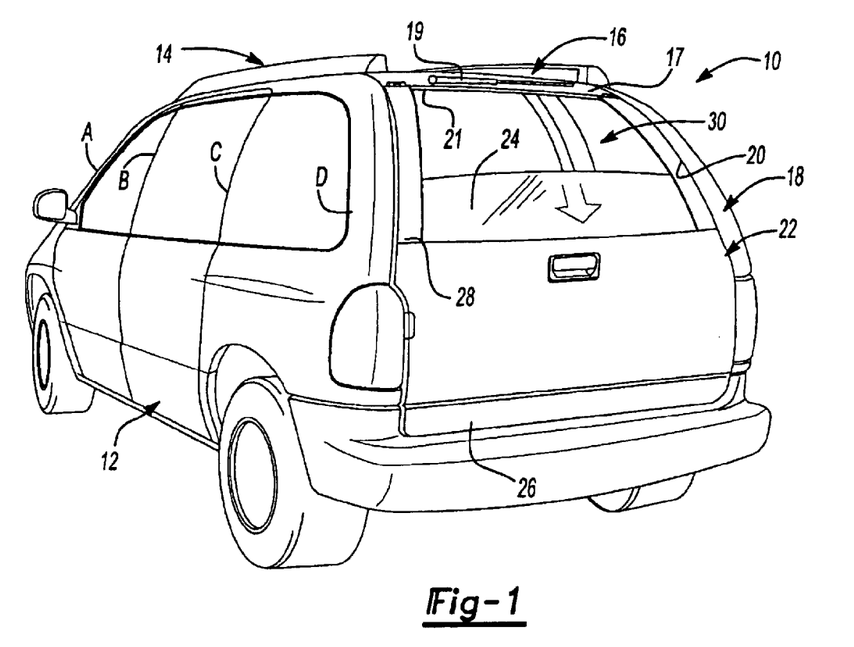
FIG. 1 is a rear perspective view of the present invention vehicle with the rear window partially open.
Figure 2:
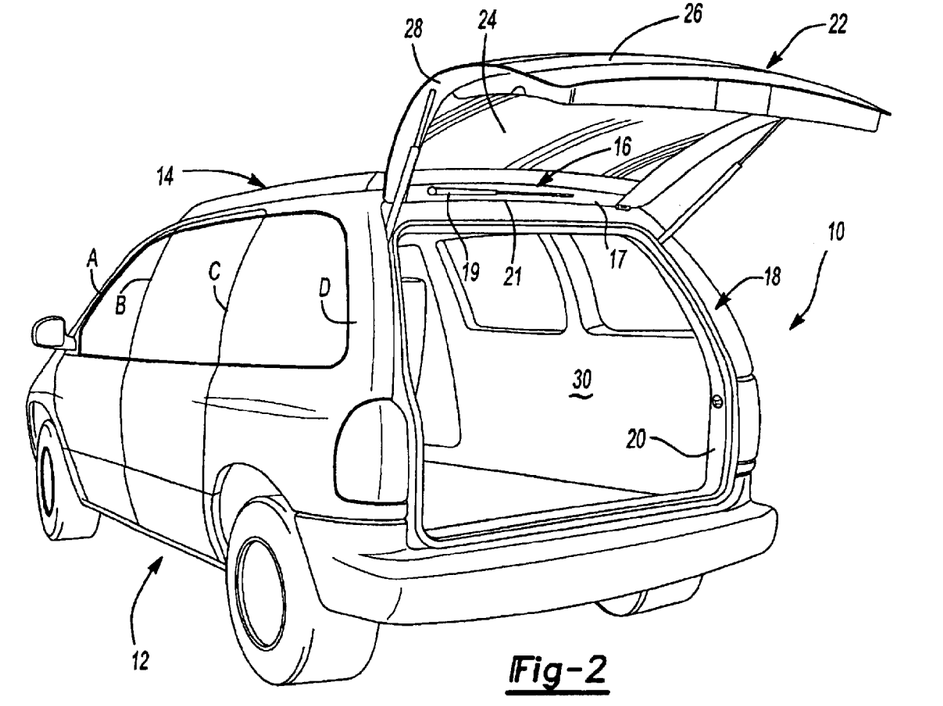
FIG. 2 is a rear perspective view of the present invention vehicle with the window partially open and the rear gate assembly pivoted upward to an open position.
Figure 3:
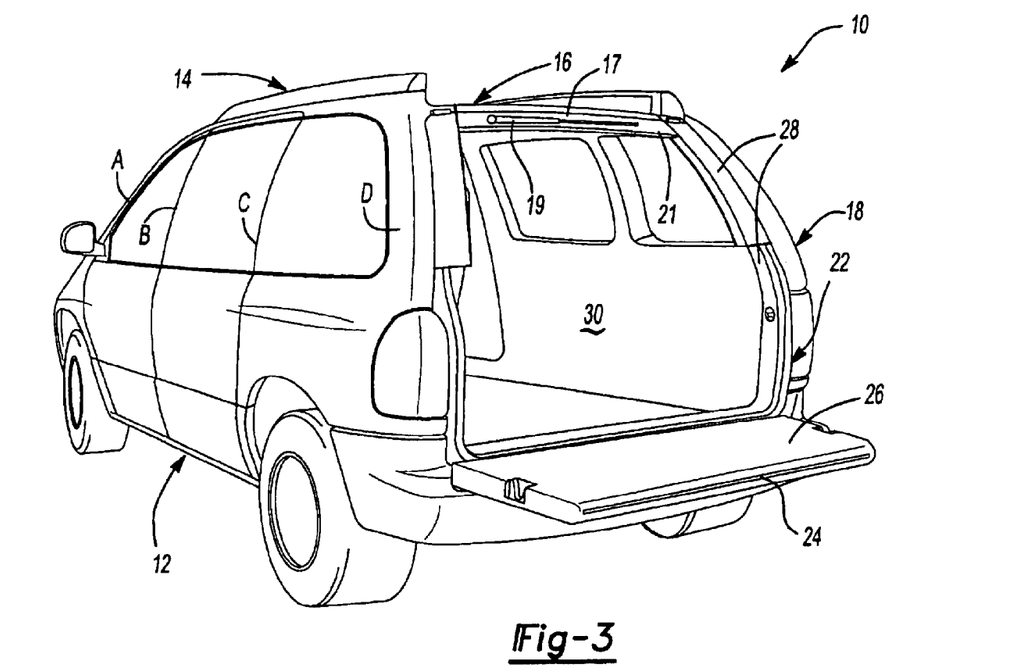
FIG. 3 is a rear perspective view of the present invention vehicle with the tailgate of the rear gate assembly pivoted downward.

A vehicle 10 utilizing the present invention is shown in FIGS. 1–3. The vehicle 10 shown has a four-door body 12 that includes A, B, C, D pillars. The body 12 has a roof 14 that includes the present invention retractable roof panel 16. The roof panel 16 has a rear header 17, which may commonly be referred to as a D pillar header for the four-door vehicle shown. A wiper 19 may be mounted to the rear header 17.

A rear body portion 18 defines a rear opening 20. A rear gate assembly 22 is mounted on the rear body portion 18 to enclose the rear opening 20. The gate assembly 22 may include a frame 28 supporting a lower body or tail gate 26 and a window 24. However, it is to be understood that any arrangement may be used for the rear gate assembly 22. As shown in FIG. 1, the window 24 may be lowered from an upper boundary 21 defined by the rear header 17 into the lower body 26 to provide partial access to the cargo area 30 or for manipulating the roof panel 16 during opening and closing. As shown in FIG. 2, the window and tailgate 26 may move pivotally upward with the frame 28 to act as a lift gate. For configurations in which the wiper 19 is mounted to the rear header 17, the window 24 may be partially opened to ensure clearance of the wiper 19. As shown in FIG. 3, the frame 28 may remain secured to the rear body portion 18 to manipulate the tail gate 26. The window 24 may be lowered into the tail gate 26, and the tail gate may be rotated downward to permit access to the cargo area 30 of the interior cabin so that objects may be easily slid into the rear of the vehicle. It can be appreciated that the present invention vehicle, as shown in FIGS. 1–3, functions to permit cargo of a relatively limited height to be stored in the cargo area 30 of the vehicle 10.

Figure 4:
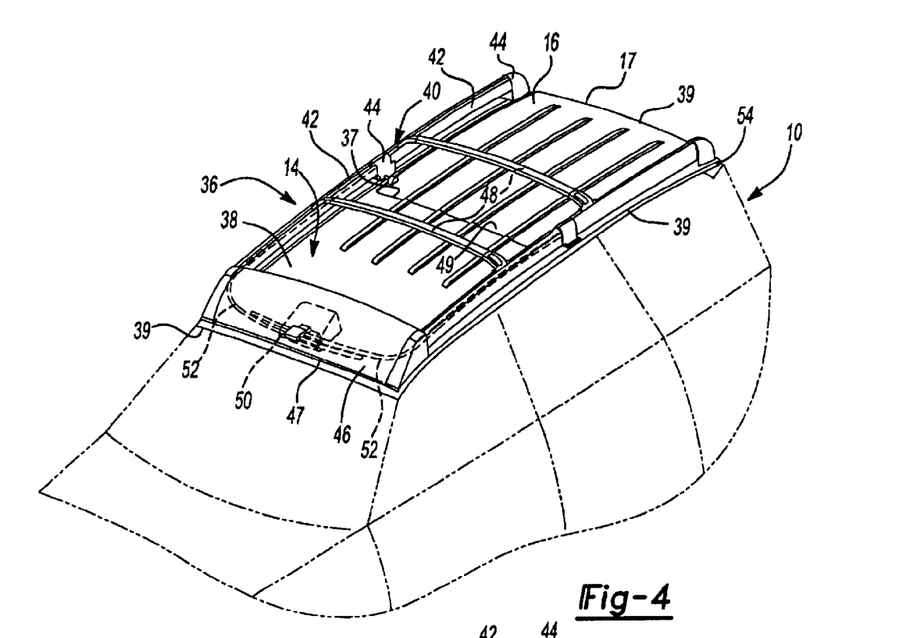
FIG. 4 is a front perspective view of the present invention retractable roof in a closed position.
Figure 5:
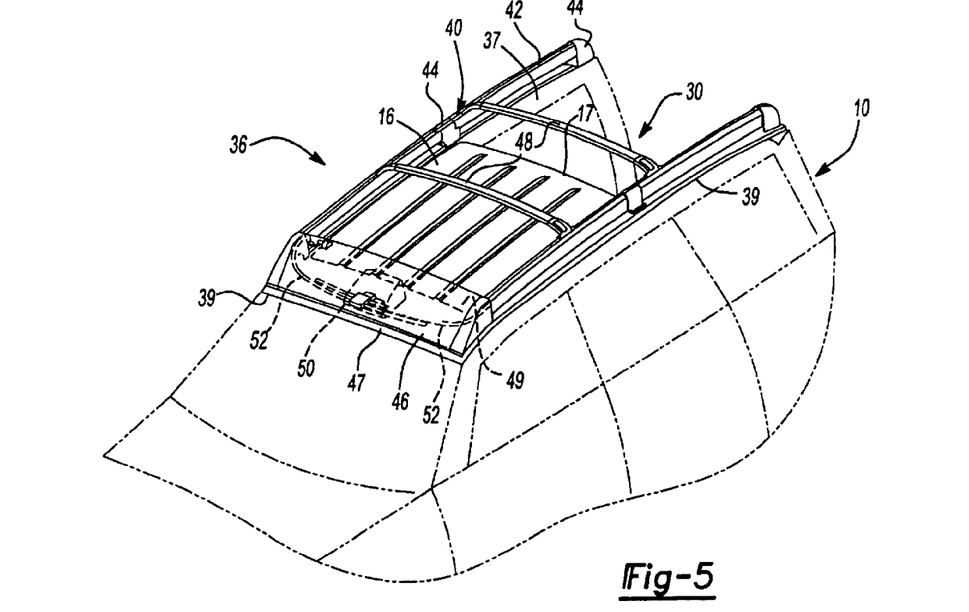
FIG. 5 is a front perspective view of the present invention retractable roof in an open position.
Figure 6:
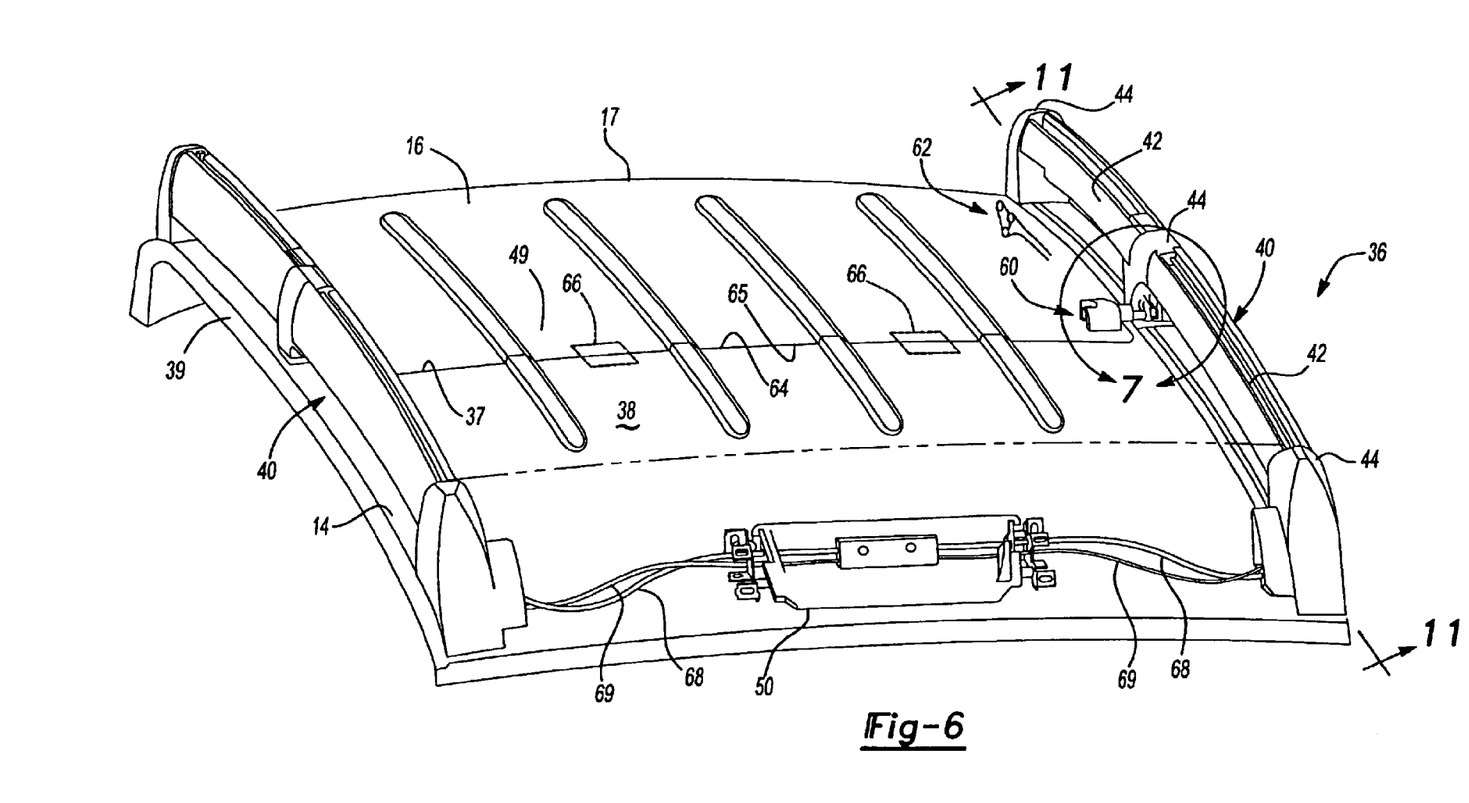
FIG. 6 is a front perspective view of the present invention roof assembly.

Referring to FIGS. 4–6, the roof 14 may be provided by a roof assembly 36 that may be secured to the rest of the vehicle body during assembly of the vehicle 10. The roof assembly 36 may include all of the features discussed below in addition to other features and interior trim such as head liner and dome lights, etc. The roof assembly 36 includes the roof 14 that defines a generally U-shaped roof opening 37, best seen in FIG. 5. The roof panel 16 is a rigid unitary structure that is preferably constructed from a fiber reinforced polymer material. The roof 14 may also be a fiber reinforced polymer material or may be stamped steel. The roof assembly 36 has a perimeter 39 of which the rear header 17 defines the rearward end 54 of the perimeter 39. The roof 14 includes guide rails 40 that define a path of the roof panel 16. The guide rails 40 are mounted to the exterior surface 38 of the roof 14. The guide rails include longitudinal members 42 that are secured to the roof 14 by support members 44. Luggage racks 48 may be arranged laterally between the guide rails 40.

A wind deflector 46 may be arranged at a forward end 47 of the roof 14 to direct wind over the roof panel 16 when the roof panel 16 is in the open position, as shown in FIG. 5. A motor 50 may be mounted on the exterior surface 38 of the roof 14 beneath the wind deflector 46. Drive cables 52 may be coupled to a portion of the roof panel 16 and connected to the motor 50 driving the roof panel 16 between the closed position (shown in FIG. 4) and the open position (shown in FIG. 5). The cables 52 may have a helical outer member typical of the type used in sunroofs.

The roof panel 16 of the present invention is stowed on the outside of the vehicle 10 adjacent to the exterior surface 38. The forward portion 49 of the roof panel 16 may be arranged partially under the wind deflector 46 with the roof panel 16 beneath the luggage racks 48. Unlike typical sunroof assemblies, the present invention roof panel 16 moves from the rearward end 54 of the vehicle to the forward end 47 of the vehicle. Additionally, the roof panel 16 includes the rear header 17 such that when the roof panel 16 is moved to the open position and the rear gate assembly 22 is moved to the open position very large items that may extend beyond the plane of the roof 14 may be placed easily into the cargo area 30.

Referring to FIG. 6, the roof panel 16 is shown supporting the forward portion 49 in the guide rails 40 by guide members 60. Rear guide member 62 support the rear of the roof panel 16 on the roof 14, which will be discussed in more detail below. The forward portion of the roof opening 37 includes a first wall portion 64. The forward portion 49 of the roof panel 16 includes a second wall portion 65 that is adjacent to the first wall portion 64 when the roof panel 16 is in the closed position. A latch assembly 66 is mounted underneath the wall portions 64 and 65. The latch may be arranged in any suitable location. The latch assembly 66 locks the roof panel 16 to the roof 14 when the roof is in the closed position. Preferably, two spaced apart latch assembly 66 are used to reduce the stress on the roof panel 16.

Figure 7:
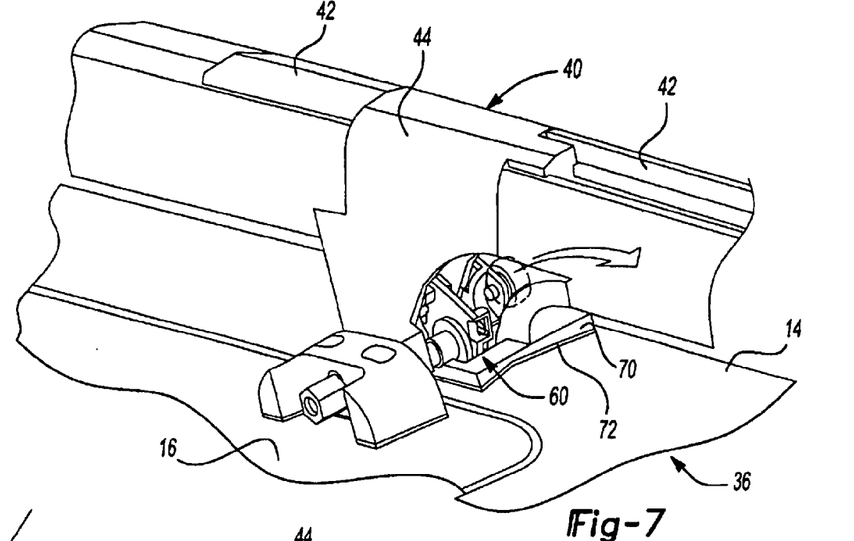
FIG. 7 is an enlarged perspective view of a guide member and guide rail with front roller mechanism.
Figure 8:
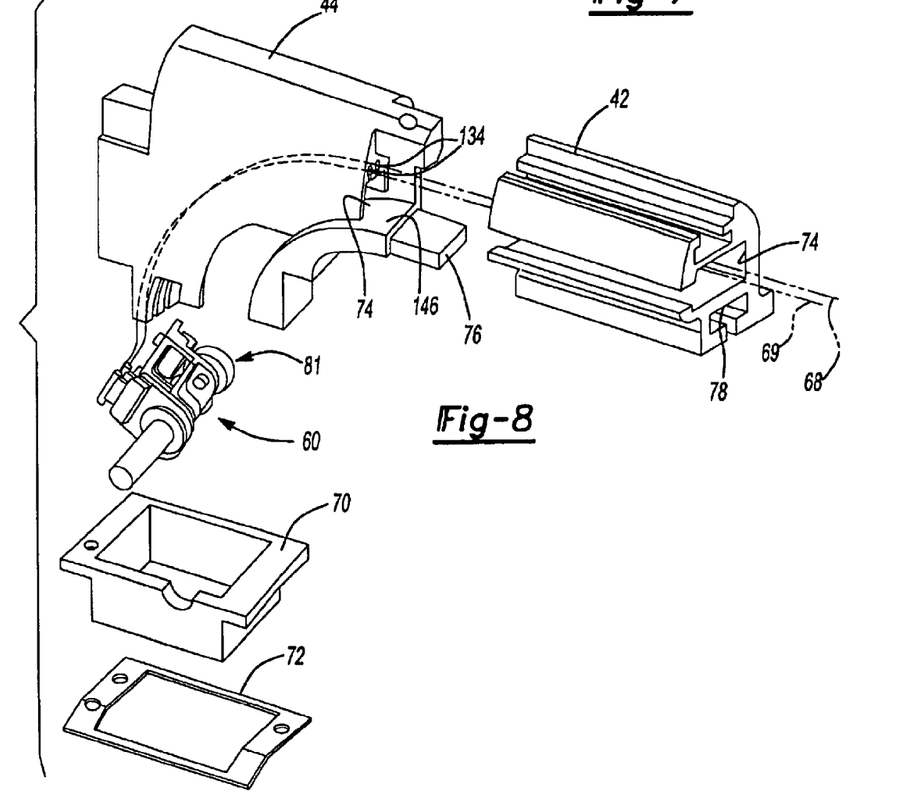
FIG. 8 is an exploded view of the guide rail and guide member shown in FIG. 7.
Figure 9:
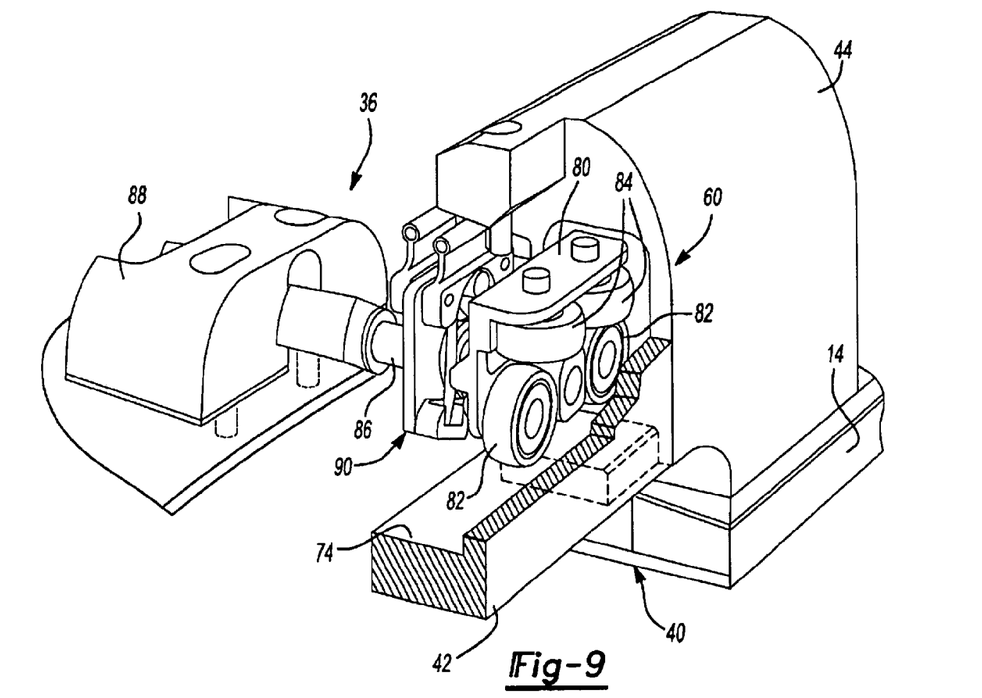
FIG. 9 is a perspective view of the guide member roller mechanism.

Referring to FIGS. 7–9, the forward guide members 60 are received within the center support members 44. The guide members 60 travel along a path in the longitudinal members 42 and support members 44 defined by a channel 74. For the embodiment shown, the rear longitudinal members 42 are for aesthetics and do not support the roof panel 16. As shown in FIG. 8, the support member 44 includes a pocket 70 received in a recess in the roof 14 (not shown) and sealed thereto by a gasket 72. As the roof panel 16 moves from the closed position to the open position the guide members 60 travel up along the channel 74 defined in the support member 44 to raise the forward portion 49 of the roof panel 16. The longitudinal 42 and support 44 members are secured to one another using a tongue 76 and groove 78 arrangement and fasteners (now shown). The drive cables 68 and wires 69 may be routed through the channel 74 and carried by a portion of the guide member 60. The wires may be routed to a rear brake light and/or the wiper 19.

Referring to FIG. 9, a guide member 60 includes a cage 80 that carries a pair of first rollers 82 rotatable about horizontal axles and second rollers 84 rotatable about vertical axes. The first rollers 82 carry the load of the roof panel 16 on the bottom of the channel 74. The second rollers 84 may ride a long a side of the channel 74 to take up any lateral clearance and guide the roof in the tracks as it moves between the open and closed positions. However, it is to be understood that any number and configuration of rollers may be used. The cage 80 includes a lateral member 86 that extends from the cage 80 to a block 88 that is secured to the roof panel 16. The lateral member 86 may include a damper to further minimize roof panel vibrations.

Figure 10:
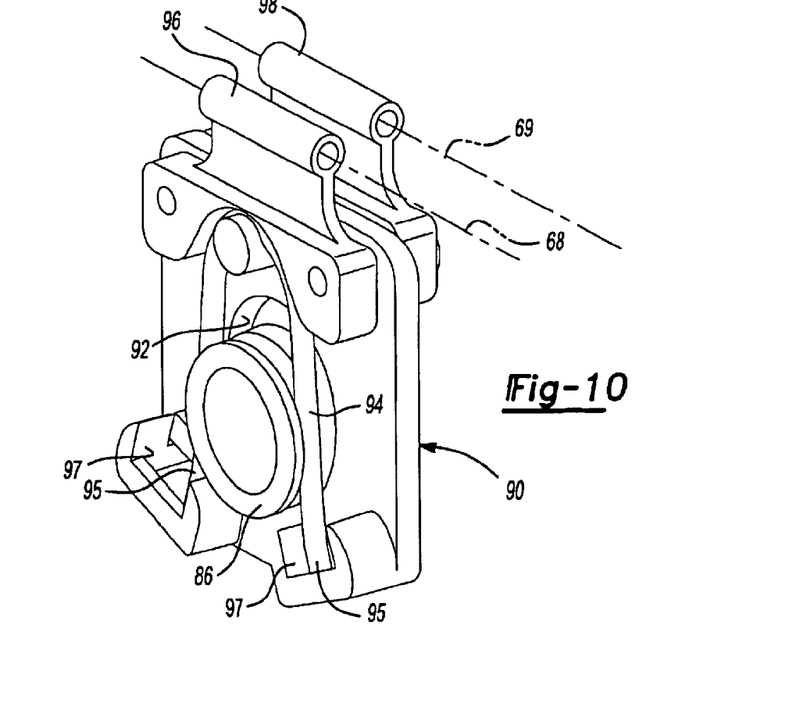
FIG. 10 is a perspective view of the guide member bracket assembly.

Referring to FIG. 10, a bracket 90 having a generally vertical elongated aperture 92 is arranged between the cage 80 and the roof panel 16 with the lateral member 86 disposed within the aperture 92. The aperture 92 permits the rollers 82 and 84 and cage 80 to move upward if the first rollers 82 must travel over debris trapped on the bottom of the channel 74. A biasing member 94 or spring normally urges the lateral member 86 downward in the aperture 92. Opposing ends 95 of the spring 94 are retained with retaining pockets 97. The drive cable 68 and wires 69 may be respectively mounted on cable 96 and wire 98 mounts secured to the bracket 90. The motor 50 pulls the roof panel 16 forward to the open position. The roof panel 16 is closed by pushing it and lowering it under the force of its own weight.

Figures 11A, 11B:
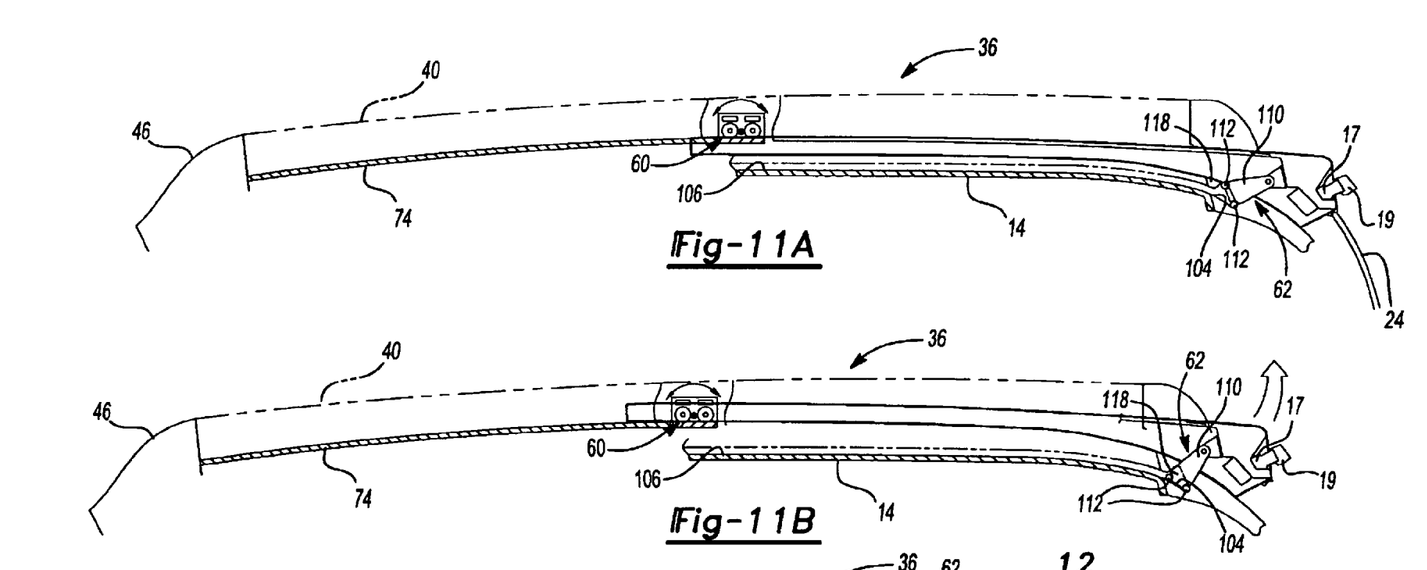
FIG. 11a is a cross-sectional view of roof panel in the closed position.
FIG. 11b is a cross-sectional view of the roof panel in a partially open position.
Figure 11C:
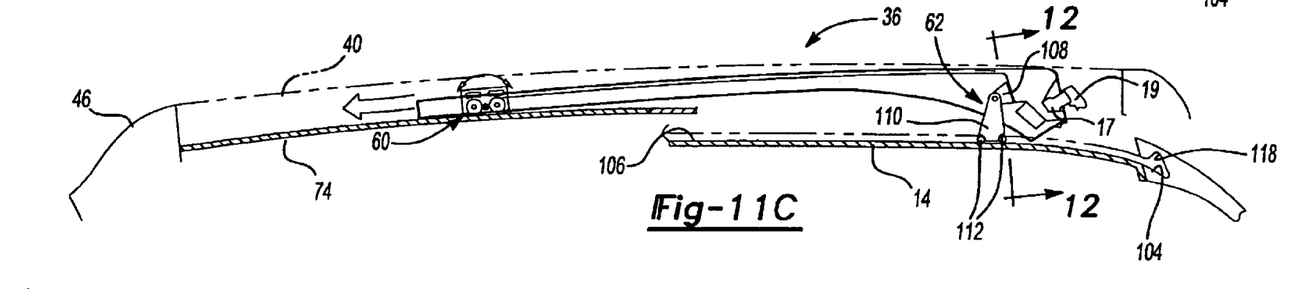
FIG. 11c is a cross-sectional view of the roof panel moving toward the open position.
Figure 12:
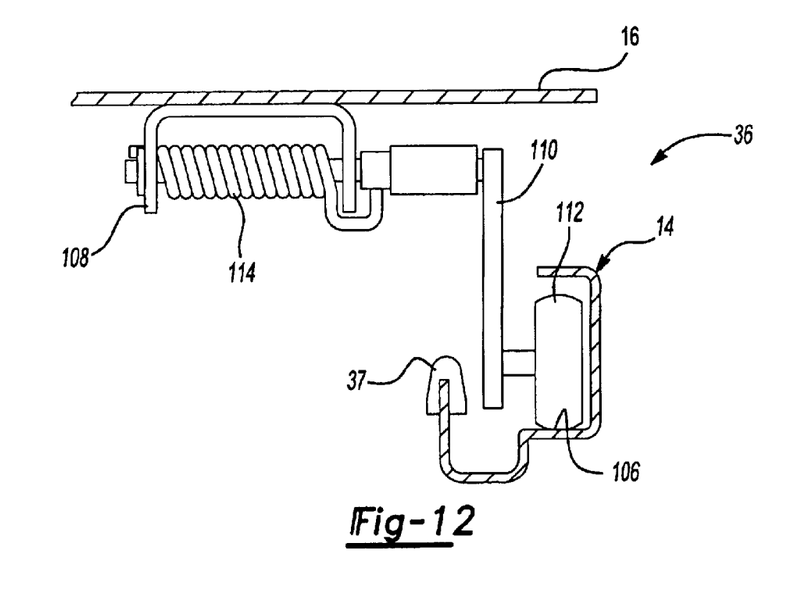
FIG. 12 is a cross-sectional view of a rear guide member.

A rear guide member 62 is best shown in FIGS. 11a–11c and 12. Unlike the forward guide member 60, the rear guide members 62 do not ride within the guide rails 40. However, it is to be understood that the rear guide member 62 may be configured such that they do ride within the guide rails 40 similar to the guide members 60. The rear guide member 62 rides along a rear aperture, which may defined by the roof assembly 36 or another portion of the vehicle 10, and a drain trough 106 which is defined by a channel arranged about the perimeter roof opening 37, which is best shown in FIG. 12. The rear guide member 62 includes a bracket 108 secured to the roof panel 16. The bracket 108 pivotally supports an arm 110 having rollers 112. A spring 114 biases the arm 110 forward away from the rear header 17. Referring to FIG. 11a, the roof panel 16 is show in a closed and locked position in which the arm 110 is tilted rearward with a roller 112 received in a recess 118 in the rear aperture 104. In this position, the rear of the roof panel 16 cannot be lifted until the roof panel is moved forward. As the roof panel 16 is moved forward, as shown in FIG. 11b, the arm 110 rotates forward as the roof panel 16. The spring 114 urges the arm 110 to unseat one of the rollers 112 from the recess 118. As the roof panel 16 continues to move forward, as shown in FIG. 11c, the rollers 112 move along the drain trough 106. The rear guide member 62 configuration provides enough lift to the rear of the roof panel 16 such that the roof panel 16 may clear the exterior surface 38 of the roof 14 when in the fully opened position.

In operation, the rear gate assembly 22 may be manipulated as described in relation to FIGS. 1–3 above to permit access to the cargo area 30. However, when increased access to the cargo area 30 is desired, for example for cargo items having a height that exceeds the plane of the roof 14, the roof panel 16 may be retracted. To retract the roof panel 16, the latch assembly 66 must be actuated to unlock the forward portion 49 of the roof panel 16 from the roof 14. The forward guide member 60 will begin to move up the channel 74 in the support member 44, and the rear guide member 62 will rotate forward such that one of the rollers 112 moves out of engagement with the recess 118. The forward guide member 60 will move along the channels 74 within the longitudinal member 42, and the rear guide member 62 and will move along the drain trough 106. The forward portion 49 of the roof panel 16 will preferably be disposed beneath wind deflector 46. Preferably when opening the retractable roof panel 16, the window 24 will be lowered into the lower body 26 to minimize the force on the window 24 when traveling along a road with the retractable roof panel 16 in the open position.

Figure 13:
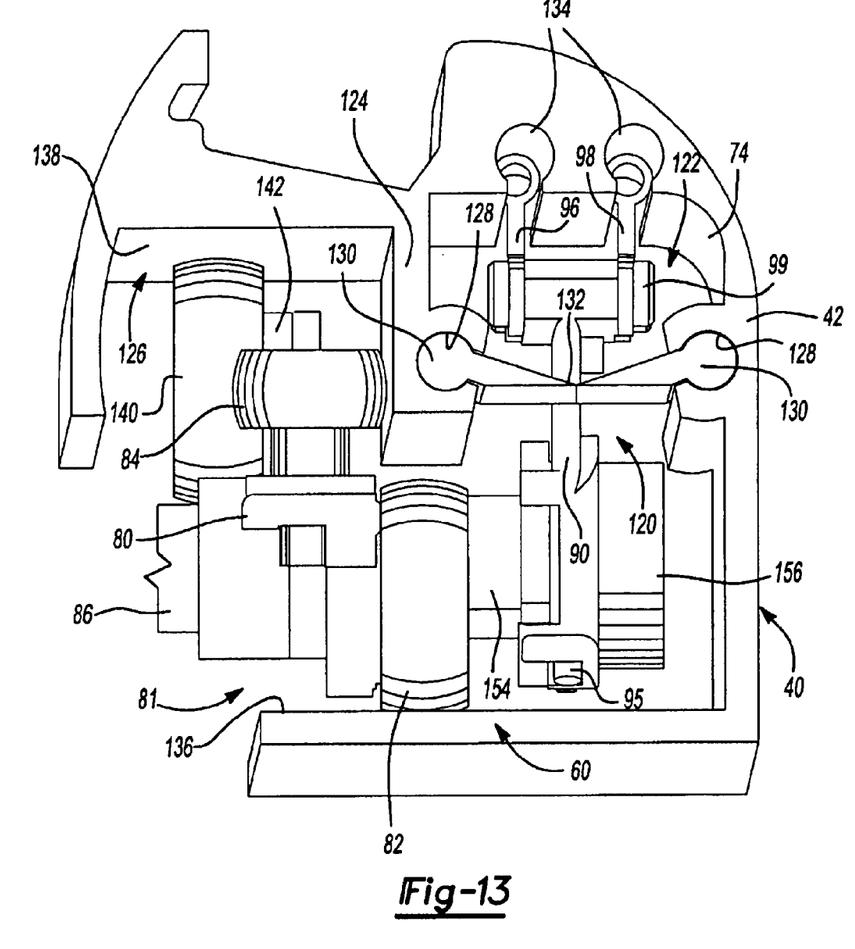
FIG. 13 is a cross-sectional view of the present invention guide member in the rail.

FIGS. 13–16 are directed to improvements of the guide member 60 to provide smoother operation of the roof assembly 36 as it moves along the tracks provided by the guide rails 40. The improved guide members 60 reduces the noise and vibration typically associated with guide members carrying the large weight of the roof assembly in the rails. Referring to FIG. 13, the guide member 60 is shown arranged within a longitudinal member 42 of the guide rails 40. The guide member 60 includes a roller assembly 81 carrying the weight of the roof assembly 36 within the guide rails 40 and a bracket 90 supported by the roller assembly 81 for transmitting the drive from the drive motor to the roller assembly 81 for moving the roof assembly between the open and closed positions. The bracket 90 is disposed within the channel 74 and has cable 96 and wire mounts secured to the bracket 90 by fasteners 99. The channel 74 includes a seal assembly 120 providing a seal compartment 122 enclosing the cable 96 and wire 98 mounts respectively carrying the drive cable and wires from debris.

Figure 13A:
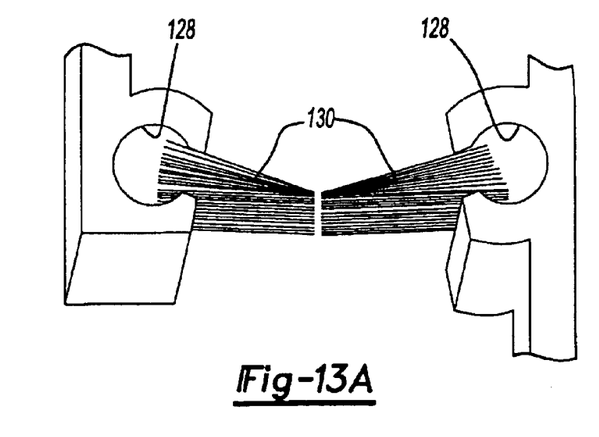
FIG. 13A depicts a rail utilizing brushes.

A wall 124 separates the channel 74 from a second channel 126. The roller assembly 81 is disposed within the second channel 126. Elongated slots 128 are arranged in the channels 74 for receiving opposing seals 130 that meet one another at a boundary 132. The seals 130 meet one another at the boundary 132 but separate from one another to accommodate the bracket 90 as it moves along the rail 40. The seals 130 may be brushes (FIG. 13A) or rubber wipers (FIG. 13). The cable 96 and wire 98 mounts have ends that are received within elongated grooves 134. The elongated grooves 134 guide the cable and wire as it moves within a rail specifically, the elongated grooves 134 are necessary to prevent the cable from buckling as the drive motor drives the cable to push the roof assembly to the closed position.

Figure 14:
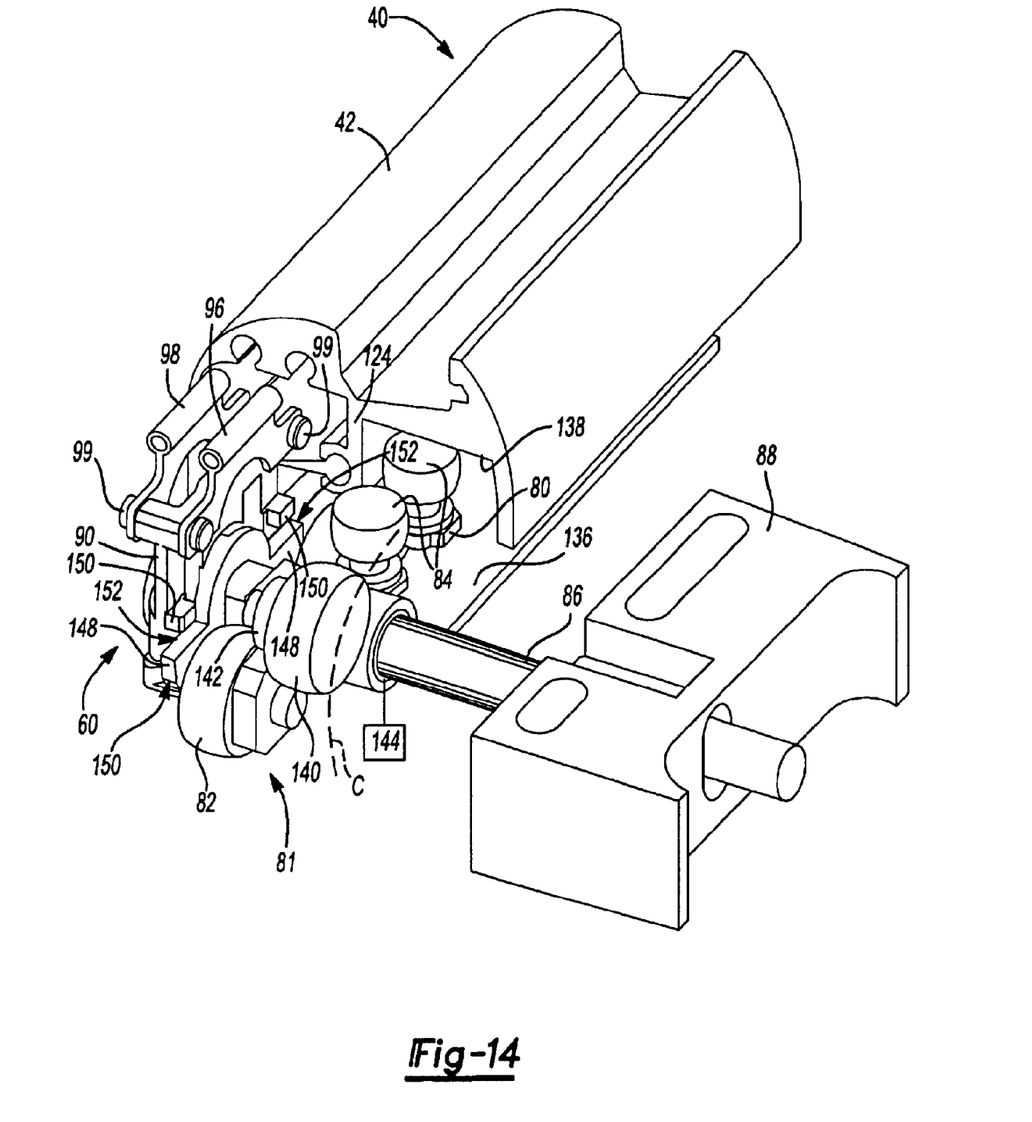
FIG. 14 is a perspective view of the inside of the guide member partially disposed in the rail.
Figure 15:
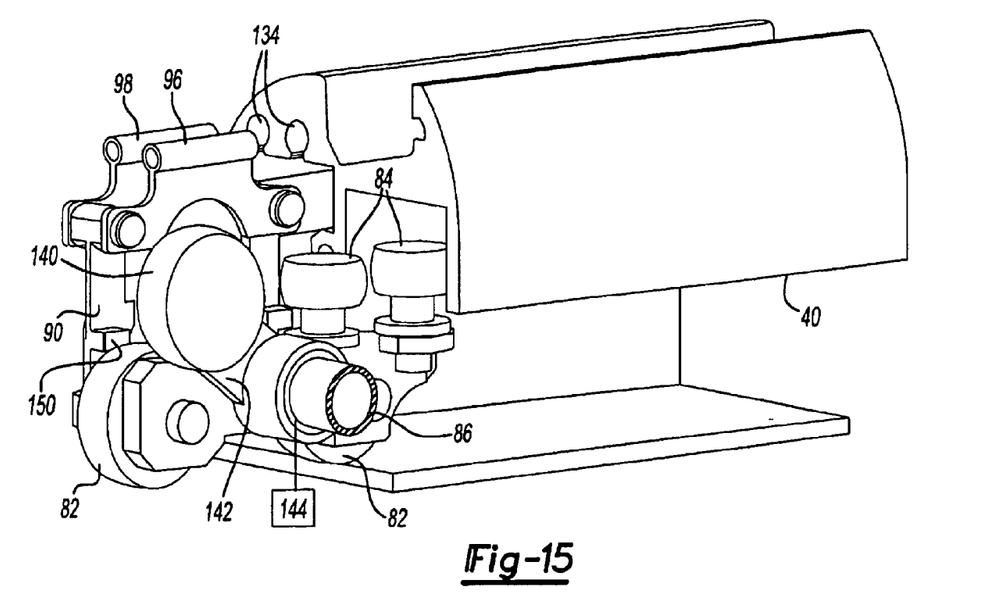
FIG. 15 is a perspective side view of the guide member and rail shown in FIG. 14.

Referring to FIGS. 13–15, two lower rollers having a horizontal axis of rotation are supported by the cage 80 of the roller assembly 81 on a floor 136 of the rail 40. Upper rollers 84 having a vertical axis of rotation engage the surface of the wall 124 and may be biased against the wall 124 by a spring mechanism in the lateral member 86. The roof assembly is stabilized by a roller 140 that is biased in the upper direction along arc C (shown in FIG. 14) against a ceiling 138 of the rail 40. The roller 140 is supported on an arm 142 pivotally attached to the cage 80. A spring 144, which is schematically shown in the figures, urges the arm 142 and roller 140 upward. The spring 144 may be a torsional spring or any suitable spring mechanism known in the art.

As discussed above, it is desirable to utilize elongated grooves 134 to guide the drive cable as it pushes the roof assembly. However, the guide member 60 must travel along an arcuate portion in the support members 44 (best shown in FIG. 8) as the roof assembly moves upward and downward in closed positions. However, the cable does not want to bend in the elongated grooves 134 and the support members 44 as the roller assembly 81 moves along the arcuate portion 146. The present invention couples the bracket 90 to the roller assembly 81 in such a manner that the bracket 90 turns with the roller assembly 81 to bend the cable within the curved elongated grooves 134 so that it does not bind within the grooves or excessively wear. However, the present invention guide member also is designed such that the roller assembly 81 can move over debris within the rail 40 without undesirably rotating the bracket 90 was moving along a straight groove.

Figure 16:
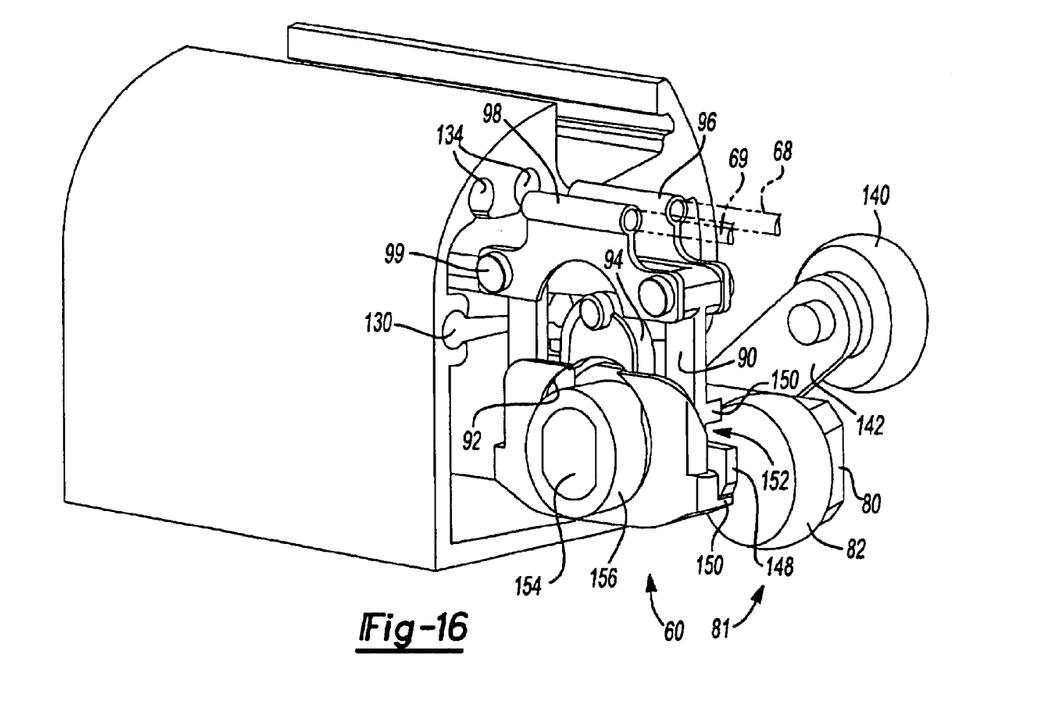
FIG. 16 is a perspective view of the outside of the guide member and rail.

Referring to FIGS. 14–16, the roller assembly 81 includes a variably opposing flanges 148 adjacent to the bracket 90. The bracket 90 includes spaced apart upper and lower stops 150 on each side of the bracket 90. A flange 148 is arranged between each pair of stops 150 and provides a gap 152 preferably between the flange and the upper stop to permit upward motion of the roller assembly 81 as it travels over debris on the floor 136 of the rail 40. The gap permits slight relative rotation between the roller assembly 81 and the bracket 90, approximately 3°. The roller assembly 81 includes a protruding member 154, which may be part of the lateral member 86, with a bearing 156 disposed about the protruding member 154. The bearing 156 is arranged within the aperture 92 and the bracket 90. As the roller assembly 81 travels along the arcuate portion 146. The flange 148 will engage the stop 150 and force the bracket 90 along with the mounts 96 and 98 to rotate with the roller assembly 81 thereby forcing the drive cable to bend as it moves down the arcuate portion 146. In this manner, wear caused by the drive cable and cable mounts 96 and 98 within the curved elongated grooves 134 in the support members 44 is avoided.

The invention has been described in an illustrative manner, and it is to be understood that the terminology that has been used is intended to be in the nature of words of description rather than of limitation. The vehicle 10 includes electronic hardware, software, and actuators typically available. The sequence used to open and close the roof panel 16 may be programmed and initiated by operation of a switch. Obviously, many modifications and variations of the present invention are possible in light of the above teachings. It is, therefore, to be understood that within the scope of the appended claims the invention may be practiced otherwise than as specifically described.

What is claimed is:

1. A roof assembly for a vehicle comprising:
   a roof having a roof opening extending to a rear of said roof, said roof having an exterior surface and forward and rearward ends;
   spaced apart guide rails supported on said exterior surface with said guide rails having a floor defining a path;
   a guide member received in each of said guide rails movable along said path, said guide member includes a roller assembly received within a channel in each of said guide rails and a bracket connected to said roller assembly supporting a drive cable with said bracket rotatable relative to said roller assembly, said roller assembly including a flange and said bracket including a stop with said flange engaging said stop rotating said roller assembly and bracket together, said roller assembly includes at least two rollers having a horizontal rotational axis and supported on said floor; and
   a retractable roof panel with a portion supported by said guide members and movable along said path from an open roof position to a closed roof position in which said roof panel is disposed within said roof opening.

2. The roof assembly according to claim 1, wherein said roller assembly includes a cage supporting said rollers with a lateral member interconnecting said cage to said roof panel.

3. The roof assembly according to claim 2, wherein said bracket includes an aperture and said cage includes a protruding member rotatably received within said aperture.

4. The roof assembly according to claim 3, wherein said flange is interposed between a pair of spaced apart stops with a gap between said flange and at least one of said stops.

5. The roof assembly according to claim 3, wherein a pair of flanges extends from the bracket transversely relative to said protruding member with each flange arranged between a pair of spaced apart stops.

6. The roof assembly according to claim 1, wherein said path includes an arcuate portion with said flange engaging said stop in response to said rollers traveling on said arcuate portion and rotating said bracket and said roller assembly together.

7. The roof assembly according to claim 6, wherein said guide rail includes a support member defining said arcuate portion having an elongated groove receiving said drive cable, said drive cable being a helical cable in close proximity to said groove with said drive cable contacting said groove when moving said retractable roof panel from said open position to said closed position.

8. A roof assembly for a vehicle comprising:
   a roof having a roof opening extending to a rear of said roof, said roof having an exterior surface and forward and rearward ends;
   spaced apart guide rails supported on said exterior surface with said guide rails having a floor defining a path and a ceiling spaced from said floor;
   a guide member received in each of said guide rails movable along said path, said guide member includes a roller assembly received within a channel in each of said guide rails, said roller assembly includes a cage with first and second rollers each having a horizontal rotational axis, said first roller having its rotational axis fixed relative to said cage with said first roller supported on said floor, and said second roller having its rotational axis movable relative to said cage and biased by a spring into engagement with said ceiling; and
   a retractable roof panel with a portion supported by said guide members and movable along said path from an open roof position to a closed roof position in which said roof panel is disposed within said roof opening.

9. The roof assembly according to claim 8, wherein said roller assembly includes a pair of first rollers.

10. The roof assembly according to claim 8, wherein said roller assembly includes a third roller having a vertical rotational axis engaging a guide rail wall.

11. The roof assembly according to claim 10, wherein said roller assembly includes a pair of third rollers.

12. The roof assembly according to claim 10, wherein said wall separates first and second channels with said roller assembly in said first channel, and a drive cable mount in said second channel connected to and spaced laterally from said roller assembly.

13. The roof assembly according to claim 8, wherein said second roller is supported by an arm connected to said cage with said second roller movable in an arc.

14. The roof assembly according to claim 13, wherein a lateral member is interconnected between said cage and said roof panel with said lateral member supporting a said spring.

15. A roof assembly for a vehicle comprising:
   a roof having a roof opening extending to a rear of said roof, said roof having an exterior surface and forward and rearward ends;
   spaced apart guide rails supported on said exterior surface defining a path;
   a guide member received in each of said guide rails movable along said path, said guide member received within a channel in each of said guide rails, said guide member including a bracket with a drive cable connected thereto and arranged in said channel, wherein said guide member includes a roller assembly received within a second channel spaced from said channel with a wall separating said channels;
   a seal assembly arranged between said guide rail and said guide member forming a sealed compartment in said channel preventing debris from entering said compartment and obstructing said drive cable; and
   a retractable roof panel with a portion supported by said guide members and movable along said path from an open roof position to a closed roof position in which said roof panel is disposed within said roof opening.

16. The roof assembly according to claim 15, wherein said channel includes opposing elongated slots each receiving a seal extending from said slots to one another engaging one another along a boundary with a portion of said guide member arranged between said seals at said boundary.

17. The roof assembly according to claim 16, wherein said seals are brushes.

18. The roof assembly according to claim 16, wherein said seals are rubber wipers.

19. The roof assembly according to claim 15, wherein wires are connected to said bracket and disposed within said sealed compartment.

\* \* \* \* \*